United States Patent
Monahan et al.

(10) Patent No.: US 11,260,755 B2
(45) Date of Patent: Mar. 1, 2022

(54) BATTERY MANAGEMENT APPARATUS AND METHOD

(71) Applicant: JAGUAR LAND ROVER LIMITED, Coventry (GB)

(72) Inventors: Naveen Monahan, Warwickshire (GB); Baptiste Bureau, Warwickshire (GB)

(73) Assignee: Jaguar Land Rover Limited, Coventry (GB)

(*) Notice: Subject to any disclaimer, the term of this patent is extended or adjusted under 35 U.S.C. 154(b) by 60 days.

(21) Appl. No.: 16/320,254

(22) PCT Filed: Jul. 19, 2017

(86) PCT No.: PCT/EP2017/068254
§ 371 (c)(1),
(2) Date: Jan. 24, 2019

(87) PCT Pub. No.: WO2018/019680
PCT Pub. Date: Feb. 1, 2018

(65) Prior Publication Data
US 2019/0263290 A1    Aug. 29, 2019

(30) Foreign Application Priority Data
Jul. 25, 2016    (GB) .................................... 1612799

(51) Int. Cl.
*B60L 3/00*    (2019.01)
*B60L 58/20*    (2019.01)
(Continued)

(52) U.S. Cl.
CPC ............. *B60L 3/0046* (2013.01); *B60L 58/14* (2019.02); *B60L 58/20* (2019.02); *B60K 6/28* (2013.01);
(Continued)

(58) Field of Classification Search
CPC ........ B60L 3/0046; B60L 58/14; B60L 58/20; B60L 2240/545; B60L 2250/10;
(Continued)

(56) References Cited

U.S. PATENT DOCUMENTS 6,541,940 B1 *  4/2003  Jungreis ............ H01M 10/4207
                                                    320/103
7,839,116 B2 * 11/2010  Esaka ................... B60W 20/00
                                                    320/103
(Continued)

FOREIGN PATENT DOCUMENTS

EP          2434609       3/2012
GB          2510821       8/2014
KR   20110092344 A  *    8/2011  ............ H02J 7/0086

OTHER PUBLICATIONS

Search and Examination Report, GB1612799.5, dated Jan. 18, 2017, 8 pp.

(Continued)

*Primary Examiner* — M Baye Diao
(74) *Attorney, Agent, or Firm* — McCoy Russell LLP (57) ABSTRACT

The figures illustrate an apparatus (10-1, 10-2, 10-3) for a vehicle (100) comprising: first energy storage means (12) for storing electrical energy; second energy storage means (14) for storing electrical energy; and control means (16) arranged to transfer electrical energy from the second energy storage means (14) to the first energy storage means (12) when the level of electrical energy stored in the first energy storage means (12) is below a first electrical energy threshold level and the level of electrical energy stored in the second energy storage means (14) is above a second electrical energy threshold level.

21 Claims, 5 Drawing Sheets

(51) Int. Cl.
    *B60L 58/14* (2019.01)
    *B60K 6/28* (2007.10)
    *G01C 21/34* (2006.01)

(52) U.S. Cl.
    CPC ... *B60L 2240/545* (2013.01); *B60L 2240/547* (2013.01); *B60L 2250/10* (2013.01); *B60Y 2200/91* (2013.01); *B60Y 2200/92* (2013.01); *B60Y 2300/91* (2013.01); *G01C 21/3476* (2013.01); *Y02T 10/70* (2013.01)

(58) Field of Classification Search
    CPC .... B60L 2240/547; B60L 58/16; B60L 58/22; Y02T 10/70; B60K 6/28; B60Y 2200/91; B60Y 2200/92; B60Y 2300/91; G01C 21/3476; H02J 7/00306; H02J 7/342
    USPC .......................................................... 320/104
    See application file for complete search history.

(56) References Cited

U.S. PATENT DOCUMENTS

| | | | | |
|---|---|---|---|---|
| 8,027,760 B2* | 9/2011 | Chattot | ................... | B60M 3/06 |
| | | | | 701/22 |
| 8,319,472 B2* | 11/2012 | Gibbs | ..................... | H02J 7/342 |
| | | | | 320/103 |
| 8,427,098 B2* | 4/2013 | Moore | ...................... | H02J 3/14 |
| | | | | 320/103 |
| 8,774,995 B2* | 7/2014 | Ishibashi | ................. | B60L 53/68 |
| | | | | 701/22 |
| 8,816,530 B2* | 8/2014 | Callicoat | ................. | B60L 58/20 |
| | | | | 307/29 |
| 8,933,580 B2* | 1/2015 | Reichow | ................. | B60L 58/14 |
| | | | | 307/9.1 |
| 8,966,295 B2* | 2/2015 | Oglesby | ................. | G06F 1/263 |
| | | | | 713/300 |
| 9,365,115 B2* | 6/2016 | Ferrel | ....................... | B60L 1/00 |
| 9,481,258 B2* | 11/2016 | Niizuma | ................. | B60L 5/005 |
| 9,994,237 B2* | 6/2018 | Jestin | ...................... | B60L 53/11 |
| 2012/0074891 A1* | 3/2012 | Anderson | ............... | H02J 7/025 |
| | | | | 320/101 |
| 2014/0203759 A1 | 7/2014 | Sugiyama | | |
| 2014/0239879 A1* | 8/2014 | Madsen | ................... | H02J 7/342 |
| | | | | 320/104 |
| 2014/0368041 A1 | 12/2014 | Tu | | |
| 2015/0303716 A1 | 10/2015 | Lee | | |
| 2016/0001719 A1* | 1/2016 | Frost | .................... | B60L 3/0046 |
| | | | | 307/10.1 |

OTHER PUBLICATIONS

International Search Report and Written Opinion, PCT/EP17/068254, dated Nov. 13, 2017, 19 pp.

* cited by examiner

BATTERY MANAGEMENT APPARATUS AND METHOD

CROSS-REFERENCE TO RELATED APPLICATIONS

This application is a 371 of International Application No. PCT/EP2017/068254, filed Jul. 19, 2017, which claims priority to GB Patent Application 1612799.5, filed Jul. 25, 2016, the contents of both of which are incorporated by reference herein in their entirety.

TECHNICAL FIELD

The present disclosure relates to a battery management apparatus and method. In particular, but not exclusively it relates to a battery management apparatus and method in a battery electric vehicle (BEV).

Aspects of the invention relate to an apparatus for a vehicle, a method, a control means, a vehicle and a computer program.

BACKGROUND

Modern vehicles comprise electrical systems provided for the operation of the vehicle and comfort of a user or operator of the vehicle, such as the driver of the vehicle. Vehicles, such as automobiles, may have a significant number of electrical components which may include one or more of electrically powered access control sensors and systems, electrically powered steering, windows, heating and cooling systems, anti-theft systems, engine management systems, smart device interfaces, and other electrical components. Many of these electrical components have a minimum current which they draw even when the vehicle is not in use. For example, access control sensors must continually or periodically monitor for unlock signals from a remote key. As such, the electrical system's draw upon a vehicle's store of electrical energy is never zero. The current drawn by such electrical components or loads while the vehicle is not in use is referred to as the quiescent current.

Although the quiescent current may be minimal, over time it can still significantly drain a vehicle's store of electrical energy. If the vehicle is left unattended for a long period of time, the store of electrical energy may be significantly drained such that the vehicle may be unable to start up or even unlock. This is particularly significant with a battery electric vehicle as battery electric vehicles are unable to be driven without a store of electrical energy.

It is an aim of the present invention to address disadvantages of the prior art.

SUMMARY OF THE INVENTION

Aspects and embodiments of the invention provide an apparatus for a vehicle, a method, a control means, a vehicle, and a computer program, as claimed in the appended claims.

According to an aspect of the invention there is provided an apparatus for a vehicle comprising: first energy storage means for storing electrical energy; second energy storage means for storing electrical energy; and control means arranged to transfer electrical energy from the second energy storage means to the first energy storage means when the level of electrical energy stored in the first energy storage means is below a first electrical energy threshold level and the level of electrical energy stored in the second energy storage means is above a second electrical energy threshold level.

This provides the advantage of being able to transfer electrical energy between multiple energy storage means in the vehicle without preventing the vehicle from being driven. Electric vehicles such as hybrid electric vehicles and battery electrical vehicles may contain at least two energy storage means in the form of batteries. An apparatus and/or a method as described herein can ensure that a first battery stays charged even as quiescent current is drawn by electrical components, since the first battery can be charged from the second battery as necessary.

The user of the vehicle, such as a driver of the vehicle, may activate and deactivate the apparatus. The user may deactivate the apparatus to ensure that no current drain is applied to the second energy storage means. The user may activate the apparatus to provide for maintenance of electrical energy in the first energy storage means at or above a first electrical energy threshold level, as will be described further herein.

The first energy storage means may be one or more battery and/or one or more capacitor. The second energy storage means may be one or more battery and/or one or more capacitor. The control means may be an electronic controller or controller circuitry.

The first energy storage means may be a low voltage energy storage means. The first energy storage means may be a 12 volt energy storage means, such as a 12 volt battery. It may be that the first energy storage means is a lead-acid battery. Alternatively the first energy storage means may be a nickel metal hydride battery, or a lithium ion battery or any other suitable type of battery or collection of batteries. The low voltage energy storage means may provide electrical energy for onboard vehicle systems such as access control sensors which continually or periodically monitor for unlock signals from a remote key, to allow user access to the vehicle. The 12 volt battery may be considered to be fully charged at 12.6 volts. The first electrical energy threshold may be 12.5 volts. In other examples the first electrical energy threshold may be considerably lower, for example 10 volts.

Some types of energy storage means, such as nickel metal hydride batteries or lithium ion batteries, may have flatter voltage discharge characteristics and therefore the state of charge of the energy storage means may require an electrical energy threshold based on one or more additional or alternative parameters, such as energy storage means temperature and/or current integration value for the energy storage means.

The current integration value may be provided by a current counting by integration method or algorithm, or Coulomb counting method or algorithm. For example, the state of charge of an energy storage means, such as a battery, may be measured using current integration techniques whereby the state of charge of the energy storage means is calculated by measuring the energy storage means current and integrating it in time. In such circumstances the electrical energy threshold levels for the first energy storage means and second energy storage means can be expressed in terms of integrated energy storage means current for each respective energy storage means.

Further data relating to the temperature of the energy storage means and/or past or historic data relating to the energy storage means may be used to assist in the accurate estimation of the state of charge and/or the state of health of the energy storage means.

In some examples the threshold levels may be arranged to vary with the measured temperature, such as the temperature of the first energy storage means and/or the temperature of the second energy storage means. In such circumstances changes in voltage due to temperature variation can be accounted for.

The second energy storage means may be a high voltage energy storage means. The second energy storage means may be a 200 volt energy storage means, such as a 200 volt battery. The second energy storage means may be a battery with a working voltage between 100 volts and 800 volts. In one example the maximum voltage is 450 volts. In such an example the minimum voltage may be 270 volts. The use of other voltages is also possible, and this may be dependent on battery chemistry and/or load conditions.

It may be that the second energy storage means is a nickel metal hydride battery. Alternatively the second energy storage means may be a lithium ion battery, a lead-acid battery or any other suitable type of battery or collection of batteries.

The second energy storage means may have a voltage when fully charged which is higher than the voltage of the first energy storage means when fully charged. The second energy storage means may be intended to provide power to an electric motor which in turn drives one or more wheels of an electric vehicle such as a battery electric vehicle or a hybrid electric vehicle.

The apparatus may comprise a voltage level conversion means operatively connected to the first energy storage means and the second energy storage means and arranged to step up or down the voltage from the voltage of the second energy storage means to the voltage of the first energy storage means.

In one example, the apparatus may comprise a voltage level conversion means operatively connected to the first energy storage means and the second energy storage means and arranged to step down the voltage from the voltage of the second energy storage means to the voltage of the first energy storage means. In this way energy may be transferred from a high voltage energy storage means to a low voltage energy storage means.

The voltage level conversion means may be connected to the first energy storage means and the second energy storage means with or without intervening components.

The voltage level conversion means may be a voltage level converter, such as a direct current to direct current (DC to DC) step down converter.

The apparatus may comprise first measuring means arranged to measure the level of electrical energy stored in the first energy storage means and second measuring means arranged to measure the level of electrical energy stored in the second energy storage means.

The first measuring means may be a first voltage level monitoring device and the second measuring means may be a second voltage level monitoring device. In other examples, the first measuring means may measure current flowing from or to the first energy storage means, and the second measuring means may measure current flowing from or to the second energy storage means. It may be that the first and second measuring means monitor the respective charge levels by current integration, coulomb count, or by any other suitable method.

The first measuring means may also measure temperature. The second measuring means may also measure temperature. The measurement of temperature may alternatively be carried out using separate temperature measurement means.

The first measuring means may be arranged to periodically measure the level of electrical energy stored in the first energy storage means. The period may be fixed or variable. If variable, the period may depend on a previously measured level of electrical energy stored in the first energy storage means, for example a previously measured voltage level, such that when the measured the state of charge of the first energy storage means, for example the measured voltage level, is significantly higher than the first threshold level then the time until the next measurement may be larger than if the measured state of charge of the first energy storage means, for example the measured voltage level, is close to the first threshold level. That is, the period between measurements of the electrical energy stored in the first energy storage means decreases as the level of electrical energy stored in the first energy storage means decreases. Alternatively, the first measuring means may be arranged to measure the level of electrical energy stored in the first energy storage means continuously.

The second measuring means may be arranged to periodically measure the level of electrical energy stored in the second energy storage means. The period may be fixed or variable. If variable, the period may depend on a previously measured level of electrical energy stored in the second energy storage means, for example a previously measured voltage level, such that when the measured the state of charge of the second energy storage means, for example the measured voltage level, is significantly higher than the second threshold level then the time until the next measurement may be larger than if the measured state of charge of the second energy storage means, for example the measured voltage level, is close to the second threshold level. That is, the period between measurements of the electrical energy stored in the second energy storage means decreases as the level of electrical energy stored in the second energy storage means decreases. Alternatively, the second measuring means may be arranged to measure the level of electrical energy stored in the second energy storage means continuously.

The measured values of voltage and/or current and/or temperature may be stored. The stored data may provide past or historical data relating to the energy storage means which may be used to assist in the accurate estimation of the present state of charge and/or the state of health of the energy storage means.

The period between measurements of the level of electrical energy stored in the first energy storage means may be the same as the period between measurements of the level of electrical energy stored in the second energy storage means. Alternatively, the period between measurements of the level of electrical energy stored in the first energy storage means may be independent of the period between measurements of the level of electrical energy stored in the second energy storage means.

The period between measurements of the level of electrical energy stored in the first energy storage means and the period between measurements of the level of electrical energy stored in the second energy storage means may be dependent on the respective differences between the last measurement of the level of electrical energy, for example the last voltage measurement, and the threshold level for each energy storage means.

The period between measurements of the level of electrical energy stored in the respective first and second energy storage means may be predetermined. For example, the predefined period of time may be ten minutes, or an hour, or twelve hours, or one day, or a week. The predefined period of time may vary with time. For example, the predefined period of time may be first a week, then a day, and then an hour. The predefined period of time may then remain an hour until the respective energy storage means is next charged. The predefined period of time may then reset so that it is first a week, then a day and then an hour again.

This provides the advantage of optimizing electrical energy usage in the monitoring or measurement of the electrical energy stored in the first and second energy storage means. Thus the drain on the first energy storage means in the monitoring of the first and second energy storage means is minimized.

The first measuring means and the second measuring means may be the same measuring means, arranged to measure each of the level of electrical energy stored in the first energy storage means and the level of electrical energy stored in the second energy storage means in a time differentiated sequence.

This provides the advantage of reducing the number of measuring means required to monitor the electrical energy levels, for example the voltage levels, of the first energy storage means and second energy storage means.

For example, the level of electrical energy stored in the first energy storage means may be measured every thirty minutes and the level of electrical energy stored in the second energy storage means may be measured every thirty minutes, with each measurement of the second energy storage means being taken fifteen minutes after each measurement of the first energy storage means. Alternatively the measurements of each of the energy storage means may be provided sequentially, i.e., the measurement of the second energy storage means immediately follows cessation of the measurement of the first energy storage means.

The control means may be arranged to determine whether the level of electrical energy stored in the first energy storage means is below a first electrical energy threshold level from measurements obtained from the first measuring means and to determine whether the level of electrical energy stored in the second energy storage means is above a second electrical energy threshold level from measurements obtained from the second measuring means.

The control means may be arranged to prevent or stop the transfer of electrical energy from the second energy storage means to the first energy storage means when the level of electrical energy stored in the second energy storage means falls to or below the second electrical energy threshold level.

The control means may be arranged to facilitate the sending of a message, for example a short message service (SMS) message, voice message, or email, to the user via a telecommunications network, to be received at a mobile device of the user. The message may indicate the status of the second energy storage means. For example, the message may indicate that the level of electrical energy in the second energy storage means is at the second electrical energy threshold level. The message may provide instructions on the procedure to follow on return to the vehicle in order for the user to be able to drive the vehicle. This provides the advantage of alerting a user to any potential problems with the energy storage means.

The control means may be arranged to prevent or stop the transfer of electrical energy from the second energy storage means to the first energy storage means when the level of electrical energy stored in the first energy storage means subsequently rises to or above a third electrical energy threshold level.

The third electrical energy threshold level may be higher than the first electrical energy threshold level. For example when the measurement of electrical energy is based on a voltage measurement, the third electrical energy threshold may be 12.6 volt. This may then provide hysteresis for the charging cycle, to reduce the frequency of the switching of the charging on and off.

The control means may be arranged to prevent the transfer of electrical energy from the second energy storage means to the first energy storage means when the frequency of transfer of electrical energy from the second energy storage means to the first energy storage means exceeds a threshold frequency value.

This provides the advantage of preventing erroneous discharge of the second energy storage means if a fault has occurred in or at the first energy storage means.

The second electrical energy threshold level may be a predetermined minimum state of charge.

This provides the advantage of allowing drive of the vehicle when the user returns to the vehicle, as the high voltage energy storage means, used to drive the vehicle, may retain enough charge for the vehicle to be driven. The user can then jump start, and drive, the vehicle. The jump start of the vehicle may be provided by an external battery source.

The predetermined minimum state of charge may be user selectable. A user input may be provided for the user to input the selectable predetermined state of charge. The user input may be provided as a human machine interface in the vehicle, and/or may be provided as part of an interface provided on a mobile device, such as a mobile telephone, such that the predetermined state of charge may be set by the user, remotely from the vehicle.

The predetermined minimum state of charge may be a percentage of the fully charged state of the second energy storage means. The predetermined minimum state of charge may be, for example, 25% of the fully charged value of the second energy storage means. In other examples the predetermined minimum state of charge may be between 10% and 50% of the fully charged value of the second energy storage means.

The predetermined minimum state of charge may depend on the energy storage means capacity. The predetermined minimum state of charge may depend on the expected current consumption associated with the vehicle. For example, a 10% minimum state of charge may equate to 3.5 miles (5.6 km) range for a plug-in hybrid electric vehicle and may equate to 25 miles (40 km) range for a battery electric vehicle.

The predetermined minimum state of charge may be a different default value, and may be selected or set by the user of the vehicle prior to leaving the vehicle, or as an initial vehicle set up according to user preferences.

The predetermined minimum state of charge may be set to provide a level of electrical energy in the second energy storage means sufficient for the vehicle to travel a distance to one or more charging points.

This provides the advantage of allowing drive of the vehicle when the user returns to the vehicle, and ensuring the vehicle at least has enough stored electrical energy to reach a nearest charging point.

If more than one nearby charging point is identified, then the apparatus may provide the user with an option to select a charging point of interest. This then provides the advantage of allowing a user to choose which nearby charging point to travel to, such that the user's ongoing travel is subjected to the least disruption. For example, two charging points may be identified nearby, each requiring the user to head in a different direction of travel, and the user may then choose which of the two charging points is most convenient for an ongoing journey. The user can then jump start the vehicle and drive it to the nearest, or a selected nearby, charging point.

In some examples, charging points may be considered nearby when within close range of the vehicle, such as within the 25 miles (40 kilometres). It will be appreciated that the term 'nearby' may mean a different distance depending on the capabilities of the vehicle and/or the distribution of charging points in a road system on which the vehicle is being or is to be driven. If a road system has a higher concentration of charging points, then the term 'nearby' may be considered to mean within 10 miles (16 kilometres). The term 'nearby' may mean within range of the vehicle when the second energy storage means is at 25% capacity i.e., 25% of the fully charged value of the second energy storage means.

The distance to the one or more charging points may be determined from satellite navigation data in conjunction with data regarding the location of the one or more nearby charging points. A vehicle satellite navigation system may provide the location of the one or more nearby charging points, for example from data held in a memory of or associated with the satellite navigation system, which may be local to, or remote from, the vehicle. Additionally, or alternatively, data relating to the location of nearby charging points may be stored separately on the vehicle or remote from the vehicle, for example in a memory, for access by the control means or a separate vehicle control system, which may include a processor and may be part of an electronic control unit (ECU) of the vehicle. Such data may be stored at a remote computer or server to which the vehicle may communicate. Such a computer or server may form part of a cloud computing based system. The vehicle satellite navigation system, control means or vehicle control system may then calculate the driving distance to such nearby charging points. Alternatively, data relating to the location of nearby charging points may be requested via, and provided via, a communication system, such as a cellular or Wi-Fi communication system, when required by the vehicle satellite navigation system, control means or vehicle control system.

The location of the one or more nearby charging points may be determined on shutdown of the vehicle. Shutdown of the vehicle may be signaled, indicated or determined when an electrical input signaling or indicating operation of the vehicle ceases, when a user removes a key from the vehicle, or when a user exits the vehicle. Alternatively, the location of one or more nearby charging points may be determined during operation of the vehicle and the last known location of the one or more nearby charging points stored on shutdown of the vehicle. The location of one or more nearby charging points may be determined continuously or periodically. If determined periodically, the period between determination of the location of one or more nearby charging points may depend on one or more of the distance travelled by the vehicle, a speed of the vehicle and a time between determinations.

Information or data regarding the location of the one or more nearby charging points may be stored in a memory. The information or data regarding the location of the one or more nearby charging points may be used to determine the minimum predetermined state of charge required to provide a level of electrical energy in the second energy storage means sufficient for the vehicle to travel a required distance to the one or more charging points. Therefore, the second energy storage means may maintain a minimum level of electrical energy sufficient to the reach the one or more charging points.

The user may set the minimum number of reachable charging points to be offered to the user when returning to the vehicle after the second energy storage means has reached the second electrical energy threshold level. This minimum number of reachable charging points may be limited by the maximum number of reachable charging points available on shutdown of the vehicle. For example if five charging points are within range of the vehicle on shutdown of the vehicle, then the number of reachable charging points that may be set as a minimum number to be offered to the user when returning to the vehicle cannot be more than five.

The apparatus may comprise a transfer engagement means arranged to transfer or facilitate transfer of electrical energy from the second energy storage means to the first energy storage means.

The transferred electrical energy provides the advantage of allowing starting of the vehicle in a normal manner, thereby avoiding the requirement for a user to jump start the vehicle.

The additional electrical energy required to start the vehicle may be comprised in the predetermined minimum state of charge required for the vehicle to reach the nearest charging point. Therefore, the predetermined minimum state of charge may comprise a first component for opening and/or starting the vehicle and a second component for driving the vehicle a predetermined distance to a charging point.

The transfer engagement means may be a physical switch or button. The transfer engagement means may be provided by a key slot to actuate a switch and/or provide contact means to engage transfer of electrical energy from the second energy storage means to the first energy storage means.

The transfer engagement means may be located in, or on, the vehicle. The transfer engagement means may be located in the boot or trunk of the vehicle, behind a fuel cap cover of the vehicle, or under the bonnet or hood of the vehicle.

The transfer engagement means may be accessible to the user via a key.

This provides the advantage of providing security for the transfer engagement means, to prevent unauthorized transfer of electrical energy between the second energy storage means and the first energy storage means. The transfer of electrical energy may take a short period of time to complete. For example the transfer of electrical energy may take up to a minute in the case of transfer between batteries. It will be understood that slower of faster transfer of energy may be possible, depending on vehicle specification and requirements. A battery C-rate for each of the batteries may limit the speed of transfer of electrical energy between batteries.

On actuation of the transfer engagement means, electrical energy may be transferred from the second energy storage means to the first energy storage means.

Once the transfer engagement means is engaged, for example, by the press of a physical switch or button, then the transfer of electrical energy between the second energy storage means and the first energy storage means provides sufficient electrical energy in the first energy storage means to allow the user to access the vehicle and start the vehicle to drive the vehicle, for example, to drive the vehicle to the nearest charging point. Therefore, this provides the advantage of allowing the user to, at least, unlock the driver's door and drive away without having to jump start the car.

This provides the advantage of transferring electrical energy to the first energy storage means to allow the user to access and drive the vehicle, even when the predetermined minimum state of charge for the second energy storage means has been reached.

The transfer engagement means may comprise a facility to dock or otherwise electrically connect a portable electronic device to the apparatus, the transfer engagement means being responsive to the docking or electrical connection of the portable electronic device to transfer electrical energy from the second energy storage means to the first energy storage means.

According to an aspect of the invention there is provided a method comprising: transferring electrical energy from a second energy storage means to a first energy storage means when a level of electrical energy stored in the first energy storage means is below a first electrical energy threshold level and a level of electrical energy stored in the second energy storage means is above a second electrical energy threshold level.

The method may comprise measuring the level of electrical energy stored in the first energy storage means; and measuring the level of electrical energy stored in the second energy storage means.

The method may comprise determining whether the level of electrical energy stored in the first energy storage means is below a first electrical energy threshold level; and determining whether the level of electrical energy stored in the second energy storage means is above a second electrical energy threshold level.

The method may comprise stopping or preventing the transfer of electrical energy from the second energy storage means to the first energy storage means when the level of electrical energy stored in the second energy storage means falls below the second electrical energy threshold level.

The method may comprise stopping or preventing the transfer of electrical energy from the second energy storage means to the first energy storage means when the level of electrical energy stored in the first energy storage means subsequently rises above a third electrical energy threshold level.

The method may comprise stopping or preventing the transfer of electrical energy from the second energy storage means to the first energy storage means when the frequency of transfer of electrical energy from the second energy storage means to the first energy storage means exceeds a threshold frequency value.

The second electrical energy threshold level may be a predetermined minimum state of charge.

The method may comprise providing for selection, by a user, the predetermined minimum state of charge. Hence the predetermined state of charge may be selectable by the user. A user input may be provided for the user to input the selectable predetermined state of charge.

The predetermined minimum state of charge may be set to provide a level of electrical energy in the second energy storage means sufficient for the vehicle to travel a distance to one or more charging points.

The method may comprise determining the distance to the one or more charging points from satellite navigation data in conjunction with data regarding the location of the one or more nearby charging points.

The method may comprise determining the location of the one or more nearby charging points on shutdown of the vehicle.

The method may comprise transferring electrical energy from the second energy storage means to the first energy storage means on actuation of a transfer engagement means.

According to an aspect of the invention there is provided a control means arranged to carry out the method as described above.

According to an aspect of the invention there is provided a vehicle comprising an apparatus as described above or a control means as described above.

The vehicle may be an electric vehicle such as a battery electric vehicle. Alternatively, the vehicle may be a hybrid electric vehicle. When the vehicle is a hybrid electric vehicle, the apparatus and method provide for start and drive of the vehicle without use of an internal combustion engine. This may therefore be beneficial when the hybrid electric vehicle does not have any fuel to operate the internal combustion engine, or when operation of the internal combustion engine would be undesirable.

According to an aspect of the invention there is provided a computer program comprising instructions that, when executed by a processor, cause an apparatus to transfer electrical energy from a second energy storage means to a first energy storage means when a level of electrical energy stored in the first energy storage means is below a first electrical energy threshold level and a level of electrical energy stored in the second energy storage means is above a second electrical energy threshold level.

According to an aspect of the invention there is provided a computer program comprising instructions that, when executed by a processor, cause a system to perform the method of as described above.

According to an aspect of the invention there is provided a non-transitory computer readable medium comprising a computer program as described above.

According to an aspect of the invention there is provided a control means for a vehicle arranged to transfer electrical energy from a second energy storage means to a first energy storage means when the level of electrical energy stored in the first energy storage means is below a first electrical energy threshold level and the level of electrical energy stored in the second energy storage means is above a second electrical energy threshold level.

The apparatus may be provided as a module comprising the control means and one or more of a first energy storage means, a second energy storage means, a voltage level conversion means, a first measuring means, a second measuring means, a transfer engagement means, a memory, and a satellite navigation system.

The apparatus may be for the management of vehicle energy storage means. The apparatus may be for the management of vehicle energy storage means in a vehicle with a plurality of energy storage means. The apparatus may be for the management of vehicle energy storage means in a battery electric vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Examples of the present disclosure relate to means for transferring electrical energy from a second energy storage means to a first energy storage means. Some examples are suited to vehicles having a first energy storage means, such as a battery, to provide electrical power to electrical vehicle systems such as electronic access control, and a second energy storage means, such as a battery, to provide electrical power to one or more electric motors which can be operated to provide motive power to the vehicle. Electrical energy can be transferred from the second energy storage means to the first energy storage means to maintain operation of electrical vehicle systems. A minimum energy threshold level for the second energy storage means maintains the vehicle's ability to be driven, even when the vehicle is not operated for a considerable amount of time.

A technical effect of at least some examples of the disclosure is that a non-zero level of energy is maintained in the second energy storage means, to enable the vehicle to be driven by the user, irrespective of how long the vehicle is left unattended.

The figures illustrate an apparatus 10-1, 10-2, 10-3 for a vehicle 100 comprising: first energy storage means 12 for storing electrical energy; second energy storage means 14 for storing electrical energy; and control means 16 arranged to transfer electrical energy from the second energy storage means 14 to the first energy storage means 12 when the level of electrical energy stored in the first energy storage means 12 is below a first electrical energy threshold level and the level of electrical energy stored in the second energy storage means 14 is above a second electrical energy threshold level.

Figure 1:
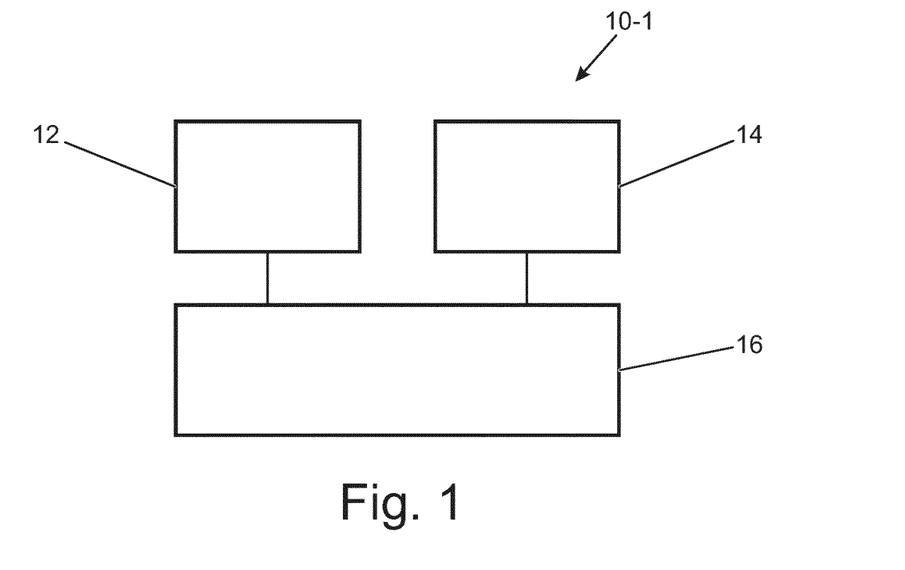
FIG. 1 illustrates an example of an apparatus.
Figure 7:
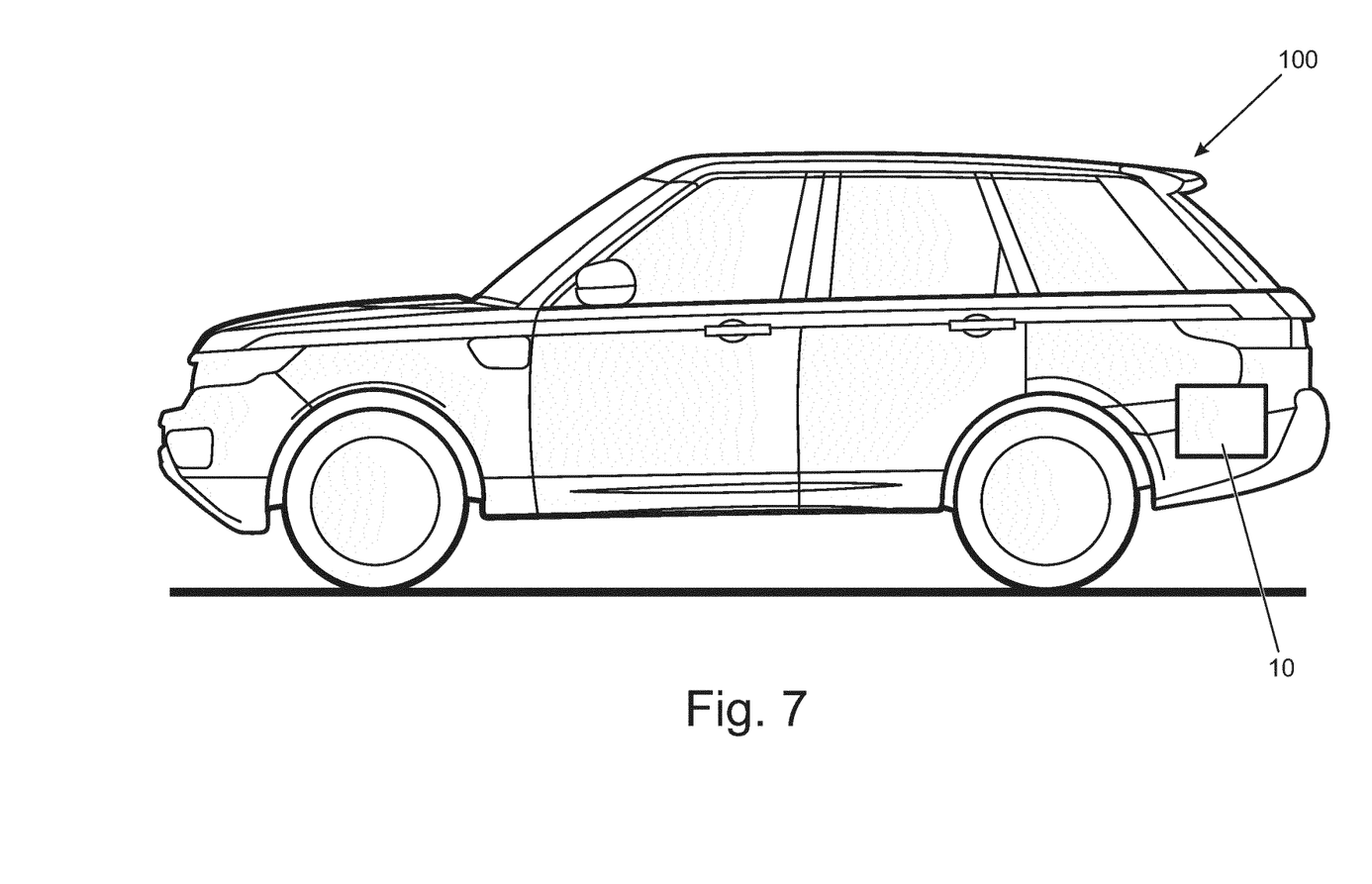
FIG. 7 illustrates an example of a vehicle.

FIG. 1 illustrates an apparatus 10-1 or system suitable for a vehicle 100. The apparatus 10-1 or system may be suitable for a car. In the example of FIG. 7, an apparatus 10, which may be for example any of apparatus 10-1, 10-2 or 10-3, is comprised in a vehicle 100. In the example of FIG. 1, the first energy storage means 12 is a battery, such as a low voltage battery, for example a 12 volt battery, used to provide electrical power to vehicle electrical systems each of which provide an electrical load. The electrical loads include the vehicle's security systems, key or entry detection sensors and systems and a number of other systems, some of which are essential to the operation of the vehicle. Some of the electrical loads draw a quiescent current from the first energy storage means even when the vehicle is not in use. This current supports the functions of systems which cannot turn off completely, for example because they must track the passage of time, or sense the operation of a remote key.

Therefore, even when the vehicle is not in use, the charge stored in the first energy storage means gradually decreases. Such a battery may be considered fully charged when the voltage level is 12.6 volt, measured across the terminals of the battery. In one example of a battery electric vehicle, the first energy storage means 12 may be a 20 Ah battery, which may be discharged in no less than twelve days under quiescent current conditions. In one example of a hybrid electric vehicle, the first energy storage means 12 may be an 80 Ah battery, which may be discharged in no less than fifty days. The capacity of a battery for a hybrid electric vehicle may be larger than that of a battery electric vehicle because of the requirements of the electrical system associated with the operation of the internal combustion engine of the hybrid electric vehicle. However, it will be understood that other capacities of battery can be used in such electric vehicles, dependent on the requirements and specification of the vehicle.

The second energy storage means 14 is a battery, such as a high voltage battery, for example a 200 volt battery, used to provide power to an electrical machine, or traction motor, which is used to provide motive force to the vehicle 100. The traction motor is used to transform electrical power from the second energy storage means 14 into mechanical force which can be used to move the vehicle 100. During braking, the traction motor can be operated as a generator to generate electrical current to charge the second energy storage means 14.

Figure 3:
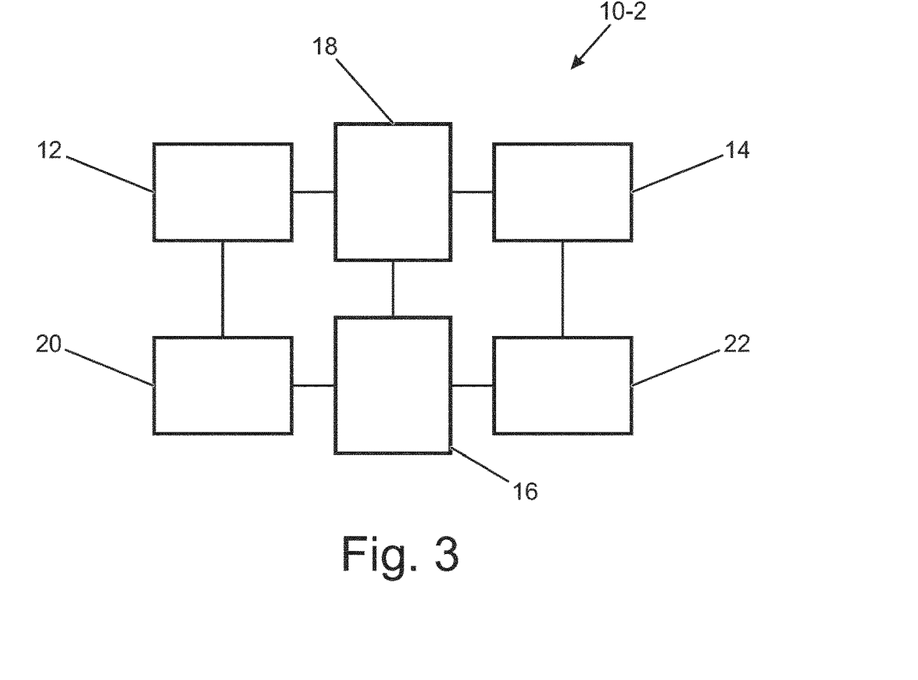
FIG. 3 illustrates an example of an apparatus.
Figure 4:
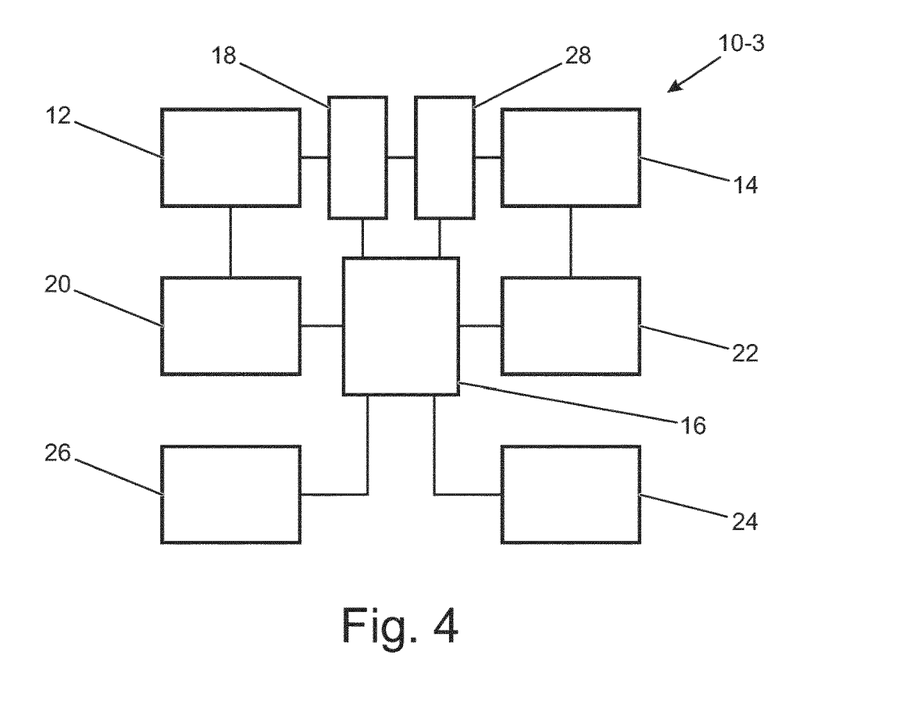
FIG. 4 illustrates an example of an apparatus.

In alternative examples, the apparatus 10-1, 10-2, 10-3 may comprise capacitors, such as super-capacitors, in place of, or additional to, the batteries.

A control means 16, in the form of an electronic controller, is arranged to transfer electrical energy from the high voltage battery 14 to the low voltage battery 12 when the level of electrical energy stored in the low voltage battery 12 is below a first electrical energy threshold level and the level of electrical energy stored in the high voltage battery 14 is above a second electrical energy threshold level.

Figure 2:
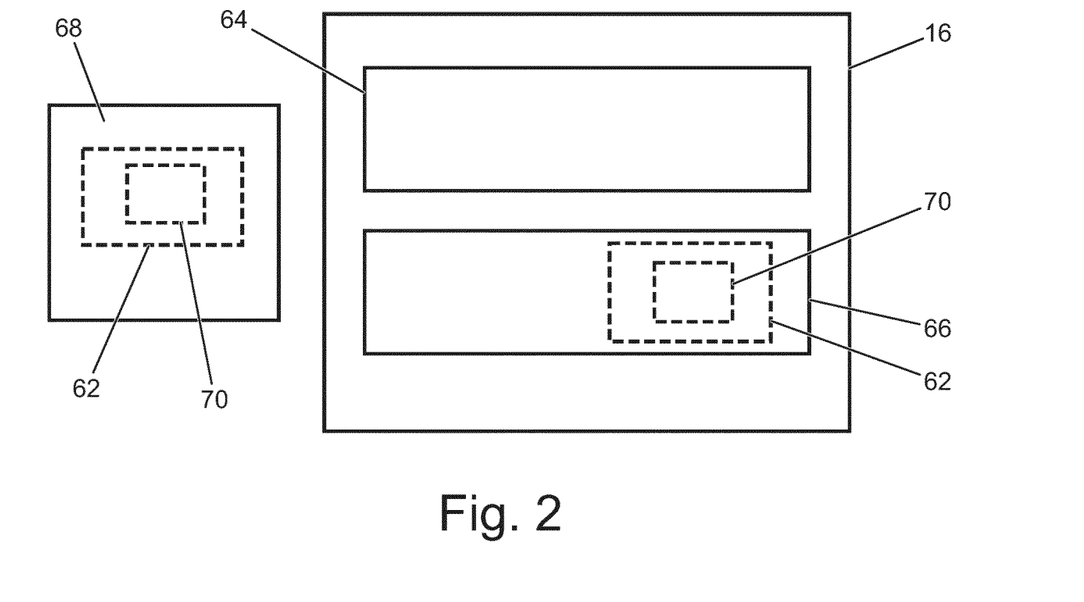
FIG. 2 illustrates an example of a control means.

FIG. 2 illustrates an example of a control means 16, in the form of an electronic controller. The electronic controller 16 may be a chip or a chipset. The electronic controller 16 may form part of one or more systems comprised in a vehicle 100, which may provide a battery management system comprised in the vehicle 100, such as the vehicle 100 illustrated in FIG. 7.

Implementation of the electronic controller 16 may be in the form of controller circuitry. The electronic controller 16 may be implemented in hardware alone, have certain aspects in software including firmware alone or can be a combination of hardware and software (including firmware).

As illustrated in FIG. 2, the electronic controller 16 may be implemented using instructions that enable hardware functionality, for example by using executable instructions 70 of a computer program 62 in a general-purpose or special-purpose processor 64 that may be stored on a computer readable storage medium 68 (disk, memory etc.) to be executed by such a processor 64.

The processor 64 is configured to read from and write to the memory 66. The processor 64 may also comprise an output interface via which data and/or commands are output by the processor 64 and an input interface via which data and/or commands are input to the processor 64.

The memory 66 stores a computer program 62 comprising computer program instructions 70 (computer program code) that controls the operation of the electronic controller 16 when loaded into the processor 64. The computer program instructions 70, of the computer program 62, provide the logic and routines that enables the system to perform at least some of the blocks of the methods illustrated in FIGS. 5 and 6. The processor 64 by reading the memory 66 is able to load and execute the computer program 62.

The electronic controller 16 therefore comprises: at least one processor 64; and at least one memory 66 including computer program code, the at least one memory 66 and the computer program code configured to, with the at least one processor 64, cause the electronic controller 16 at least to perform: transferring electrical energy from a second energy storage means 14 to a first energy storage means 12 when a level of electrical energy stored in the first energy storage means 12 is below a first electrical energy threshold level and a level of electrical energy stored in the second energy storage means 14 is above a second electrical energy threshold level.

As illustrated in FIG. 2, the computer program 62 may arrive at the electronic controller 16 via any suitable delivery mechanism 68. The delivery mechanism may be, for example, a non-transitory computer-readable storage medium, a computer program product, a memory device, a record medium such as a compact disc read-only memory (CD-ROM), digital versatile disc (DVD), or an article of manufacture that tangibly embodies the computer program 62. The delivery mechanism may be a signal configured to reliably transfer the computer program 62. The electronic controller 16 may propagate or transmit the computer program 62 as a computer data signal.

Although the memory 66 is illustrated as a single component/circuitry it may be implemented as one or more separate components/circuitry some or all of which may be integrated/removable and/or may provide permanent/semi-permanent/dynamic/cached storage.

Although the processor 64 is illustrated as a single component/circuitry it may be implemented as one or more separate components/circuitry some or all of which may be integrated/removable. The processor 64 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Returning to FIG. 1, until the high voltage battery 14 is drained to a predetermined electrical energy threshold level for the high voltage battery 14, the electronic controller 16 is arranged to control the charging of the low voltage battery 12 from the high voltage battery 14 when the low voltage battery 12 is below a predetermined electrical energy threshold level for the low voltage battery 12. The predetermined electrical energy threshold level for the low voltage battery 12 may be a measured voltage across the two terminals of the battery and may, for example, be 12.5 volt.

In order to facilitate the charging of a low voltage battery 12 from a high voltage battery 14, it is necessary to provide a voltage level conversion means 18, for example in the form of a DC to DC voltage level converter 18, as shown in FIG. 3. The DC to DC voltage level converter converts high voltage current from the high voltage battery 14 to low voltage current suitable for the low voltage battery 12.

When the energy is being transferred from a high voltage battery 14 to a low voltage battery 12 a step down converter 18 is required, such as a DC to DC step down converter 18. In other examples, the voltage of the first energy storage means 12 and the voltage of the second energy storage means 14 may be the same, such that a voltage level conversion means 18 is not required.

The voltage produced by a battery depends, at least in part, on the state of charge of the battery. Therefore, in order to determine the state of charge of the low voltage battery, a first measuring means 20 in the form of a first voltage level monitoring device may be provided. In order to determine the state of charge of the high voltage battery, a second measuring means 22 in the form of a second voltage level monitoring device may be provided.

In the example of FIG. 3, the apparatus 10-2 comprises similar components to the apparatus 10-1, shown by similar referenced components, and in addition comprises a separate first voltage level monitoring device 20 and second voltage level monitoring device 22. In other examples, the function of the first voltage level monitoring device 20 and second voltage level monitoring device 22 may be provided by a single voltage level monitoring device, capable of measuring ranges of voltages covering both the low voltage battery 12 and the high voltage battery 14, the single voltage level monitoring device being operatively connected to both the low voltage battery 12 and the high voltage battery 14, with or without intervening components.

The threshold levels for the charging and discharging of the low voltage battery 12 and high voltage battery 14 may be expressed in terms of measured voltage. Since the voltage produced by a battery may also be affected by temperature, the temperature of the low voltage battery 12 may be measured by the first measuring means 20 and the temperature of the high voltage battery 14 may be measured by the second measuring means 22. Alternatively, separate temperature measurement means, for example in the form of thermocouples, resistive temperature detectors, thermistors or a thermostat, such as a bimetallic thermostat, may be used to measure the temperature of, or at, the respective batteries. This may improve the accuracy of measurement of the state of charge of the battery.

In alternative arrangements the state of charge of a battery may be measured using current integration techniques whereby the state of charge of the battery is calculated by measuring the battery current and integrating it in time. In such circumstances the electrical energy threshold levels for the low voltage battery 12 and high voltage battery 14 can be expressed in terms of integrated battery currents for each respective battery.

In an example, the first voltage level monitoring device 20 periodically measures the voltage level of the low voltage battery 12 across the two terminals of the low voltage battery 12. If the measured voltage is at or above the first electrical energy threshold level then the low voltage battery 12 has adequate charge and the electronic controller 16 does not provide for any charging of the low voltage battery 12. By only checking on the low voltage battery 12 periodically, the electronic controller 16 minimises the power consumed in monitoring the low voltage battery 12.

After a predetermined period of time, for example, thirty minutes, the first voltage level monitoring device 20 measures the voltage level of the low voltage battery 12 across the two terminals of the low voltage battery 12 again. If the measured voltage continues to be at or above the first electrical energy threshold level then the low voltage battery 12 has adequate charge and the electronic controller 16 does not provide for any charging of the low voltage battery 12.

If however, the measured voltage falls below the first electrical energy threshold level then the low voltage battery 12 has inadequate charge and the electronic controller 16 operates to facilitate charge of the low voltage battery 12 from the high voltage battery 14 via the DC to DC voltage level converter 18. However, in order to facilitate the charging of the low voltage battery 12 from the high voltage battery 14, the high voltage battery must have adequate charge.

The second voltage level monitoring device 22 therefore measures the voltage level of the high voltage battery 14 across the two terminals of the high voltage battery 14. If the measured voltage is below the second electrical energy threshold level then the high voltage battery 14 has inadequate charge and the electronic controller 16 prevents charging of the low voltage battery 12 with the high voltage battery 14. If however, the measured voltage is above the second electrical energy threshold level then the high voltage battery 14 has adequate charge and the electronic controller 16 provides for charging of the low voltage battery 12.

In other examples, the period between measurements may be adjusted depending on the measured voltage levels. For example, as the voltage level of the low voltage battery 12 approaches the first electrical energy threshold level as the battery provides the quiescent current for the electrical vehicle systems, the period between voltage measurements decreases, in order to more accurately determine the time when the voltage of the low voltage battery 12 falls below the first electrical energy threshold level. For example, if the voltage of the low voltage battery 12 decreases to 12.55 volts the period between measurements may decrease to fifteen minutes.

In the above example, the measurement of the voltage level of the high voltage battery 14 is conditional on the measurement of the voltage level of the low voltage battery 12 indicating inadequate charge in the low voltage battery 12. This minimizes processing at the electronic controller 16, and minimizes energy usage in the monitoring of battery state for the high voltage battery 14. In other examples, the voltage level of each of the low voltage battery 12 and the high voltage battery 14 may be carried out irrespective of the state of the other battery.

If the low voltage battery 12, or a load connected to the low voltage battery 12 has, or develops a fault, causing the low voltage battery 12 to discharge in an uncontrolled way, then the high voltage battery could be discharged, down to the second electrical energy threshold level, in a short period of time. In order to prevent erroneous and/or excessive discharge of the high voltage battery 14, the electronic controller 16 may prevent charging of the low voltage battery 12 with the high voltage battery 14 if the frequency of charging of the low voltage battery 12 exceeds a threshold frequency value. In other words, discharge of the high voltage battery 14 is prevented if the low voltage battery 12 is being recharged too regularly.

The threshold frequency value may depend on the quiescent current provided to the load on the low voltage battery 12, and may, for example, indicate a current drain 110% of an expected current drain under quiescent current conditions. In other examples, the current drain may be 150% or 200% of the expected current drain under quiescent current conditions. Other values of current drain may be selected to indicate a fault condition.

Additionally, or alternatively, the electronic controller 16 may prevent charging of the low voltage battery 12 with the high voltage battery 14 if the period in which charging is being effected from the high voltage battery 14 to the low voltage battery 12 exceeds a predetermined threshold time. For example, if charging from the high voltage battery 14 to the low voltage battery 12 takes longer than a predetermined time, such as 1 minute, then the electronic controller 16 may prevent further charging of the low voltage battery 12. The threshold time may be predetermined based on vehicle characteristics such as the quiescent current expected under quiescent conditions for the vehicle. The threshold time may depend on the battery capacity or chemistry.

On cessation or prevention of charging of the low voltage battery 12 under such fault conditions, a fault may be logged by the electronic controller 16. Such a fault can later be diagnosed and corrected. In some examples, detection of a fault prevents further charging attempts. In some examples, further charging attempts may be made and additional faults logged if subsequent charging attempts flag further fault conditions.

Under a fault condition, a fault indicator can be provided to the user of the vehicle 100, by provision of a fault indicator on the vehicle, and/or by communicating with the user of the vehicle using remote communications means. In some examples a single fault condition may trigger the fault indicator. In some examples a predetermined number of logged fault conditions may be required in order to trigger the fault indicator.

In an example, an indicator located on the vehicle dashboard may indicate a battery problem, and/or an audible signal can be provided to the user when attempting to start the vehicle 100.

The electronic controller 16 may be arranged to facilitate the sending of a message, for example a short message service (SMS) message, voice message, or email, to the user via a telecommunications network, to be received at a mobile device of the user.

In an example, an SMS message may be sent to the user of the vehicle 100 indicating a fault in or at the low voltage battery 12 or load on the low voltage battery 12. Such a message can be sent at the time the fault is logged, such that the user of the vehicle 100 may be aware of the fault prior to returning to the vehicle 100.

Once charging of the low voltage battery 12 has commenced, the first voltage level monitoring device 20 periodically measures the voltage level of the low voltage battery 12 across the two terminals of the low voltage battery 12 to determine whether the voltage level has increased to, or above, a third electrical energy threshold level. If the voltage level has increased to, or above, the third electrical energy threshold level then the electronic controller operates to stop or prevent further charging of the low voltage battery 12, else the electronic controller 16 continues to facilitate the charging of the low voltage battery 12.

The third electrical energy threshold level is greater than the first electrical energy threshold level to minimize the frequency of starting and stopping the charging of the low voltage battery 12. The third electrical energy threshold level may be set to be at a voltage level such that under quiescent current consumption levels the low voltage battery 12 would not be expected to fall below the first electrical energy threshold value again until at least a measurement period, for example thirty minutes, had elapsed.

In an example arrangement, the second electrical energy threshold level is set to correspond to a predetermined minimum state of charge for the high voltage battery 14. This second electrical energy threshold level may correspond to a percentage of the fully charged value of the high voltage battery 14, and in some examples may be fixed at a level such as 25% of the fully charged value of the high voltage battery 14.

Other values of the second electrical energy threshold level may be set or selected by the user to reserve a certain range for the vehicle in the high voltage battery 14.

In alternative examples, the user may be able to set or select a different value for the second electrical energy threshold level based on their requirements, for example, if they know that after leaving the vehicle 100 for some considerable time they would need or require to travel a predetermined distance without charging. For example, the user may park the vehicle 100 at an airport before going on an extended holiday, leaving the vehicle 100 locked and with security measures activated on the vehicle 100, drawing quiescent current from the low voltage battery 12. The user may then return from the extended holiday and wish to be able to travel home without needing to charge the vehicle 100 on route, for example at the nearest charging point. For this, the user may require the second electrical energy threshold level to be set at a different value, such as 50%. The adjustment of the second electrical energy threshold level to be at a greater or lesser level may be temporary, and may be, for example, reset following the next charging of the high voltage battery 14. Alternatively, the adjustment of the second electrical energy threshold level to be at a greater or lesser level may be semi-permanent, and only adjusted again when the user inputs a new second electrical energy threshold level.

In another example, the second electrical energy threshold level may be set to provide a level of electrical energy in the high voltage battery 14 sufficient for the vehicle 100 to travel a required distance to one or more charging points. Data regarding the location of the one or more charging points may be stored in, or associated with, a satellite navigation system 24, as illustrated in FIG. 4. In the example of FIG. 4, the apparatus 10-3 comprises similar components to apparatus 10-1 and apparatus 10-2, shown by similar referenced components, and in addition comprises the satellite navigation system 24.

The data regarding the location of the one or more charging points may be stored in a memory 26 in the vehicle either at, or remote from, the satellite navigation system 24. The distance to the one or more charging points may then be determined from satellite navigation data in conjunction with the data regarding the location of the one or more nearby charging points. The determination may be made at the vehicle satellite navigation system 24, at the electronic controller 16, or in a separate vehicle control system. The location of one or more charging points within range of the vehicle 100 can then be provided to the user for selection. The satellite navigation system 24 can then direct the user to the selected charging point.

The number of charging points determined to be nearby charging points may be determined by availability of charging points within various ranges of the vehicle 100, which may include the number of charging points within the maximum range of the vehicle 100, and/or by user set preferences.

The user, for example, may set a minimum number of available charging points to be five, to provide a choice of charging point when returning to the vehicle 100. This may then dictate the required range of the vehicle 100 to meet the minimum number of available charging points and therefore fix the second electrical energy threshold level to provide a level of electrical energy in the high voltage battery 14 sufficient for the vehicle 100 to travel a required distance to the furthest of the charging points, i.e., if a minimum of five charging points is required by the user, and five charging points are at least determined to be within the maximum range of the vehicle 100, then the second electrical energy threshold level is set to allow the vehicle 100 to travel to the furthest of those five charging points.

When the user shuts down the vehicle 100, by for example removing a key from the vehicle 100, exiting the vehicle 100 or locking the vehicle 100, the location of the one or more nearby charging points may be determined such that a minimum predetermined state of charge required to provide a level of electrical energy in the high voltage battery 14 can be determined which is then sufficient for the vehicle 100 to travel a required distance to the one or more charging points.

In an example, when the high voltage battery 14 has reached the second electrical energy threshold, the low voltage battery 12 is no longer able to be charged by the high voltage battery 14. In such circumstances, the low voltage battery 12 continues to power electronic components of the vehicle 100. When returning to the vehicle at some later time, the user of the vehicle 100, may not be able to drive the vehicle 100 or even enter the vehicle 100, since the low voltage battery 12 may be drained such that electrical components of the vehicle 100 no longer operate in a desired manner, for example an electronic access system may fail to allow access to the vehicle 100.

As illustrated in FIG. 4, the apparatus 10-3 may comprise a transfer engagement means 28, in the form of a physical switch located within the boot, or trunk, of the vehicle 100. The physical switch 28 is arranged to facilitate a transfer of electrical energy from the high voltage battery 14 to the low voltage battery 12, such that electrical energy sufficient to enter and start the vehicle 100 is provided to the low voltage battery 12.

A key, for example a vehicle key, may be used to provide secure access to the boot or trunk of the vehicle 100 to allow access to the switch 28. The switch may alternatively be located elsewhere on the vehicle such as under the bonnet or hood of the vehicle 100, behind a lockable fuel cap of the vehicle 100, or in an accessible interior of the vehicle 100. The user may then actuate the switch 28 to transfer electrical energy from the high voltage battery 14 to the low voltage battery 12. The switch 28 may be actuated using the vehicle key or key fob. The switch 28 may enable a DC to DC converter to transfer energy from the high voltage battery 14 to the low voltage battery 12.

The amount of electrical energy required to be transferred from the high voltage battery 14 to the low voltage battery 12 may be taken into consideration when determining the second electrical energy threshold level, such that the predetermined minimum state of charge comprises a first component for starting the vehicle 100 and a second component for driving the vehicle 100 a predetermined distance to a charging point.

Figure 5:
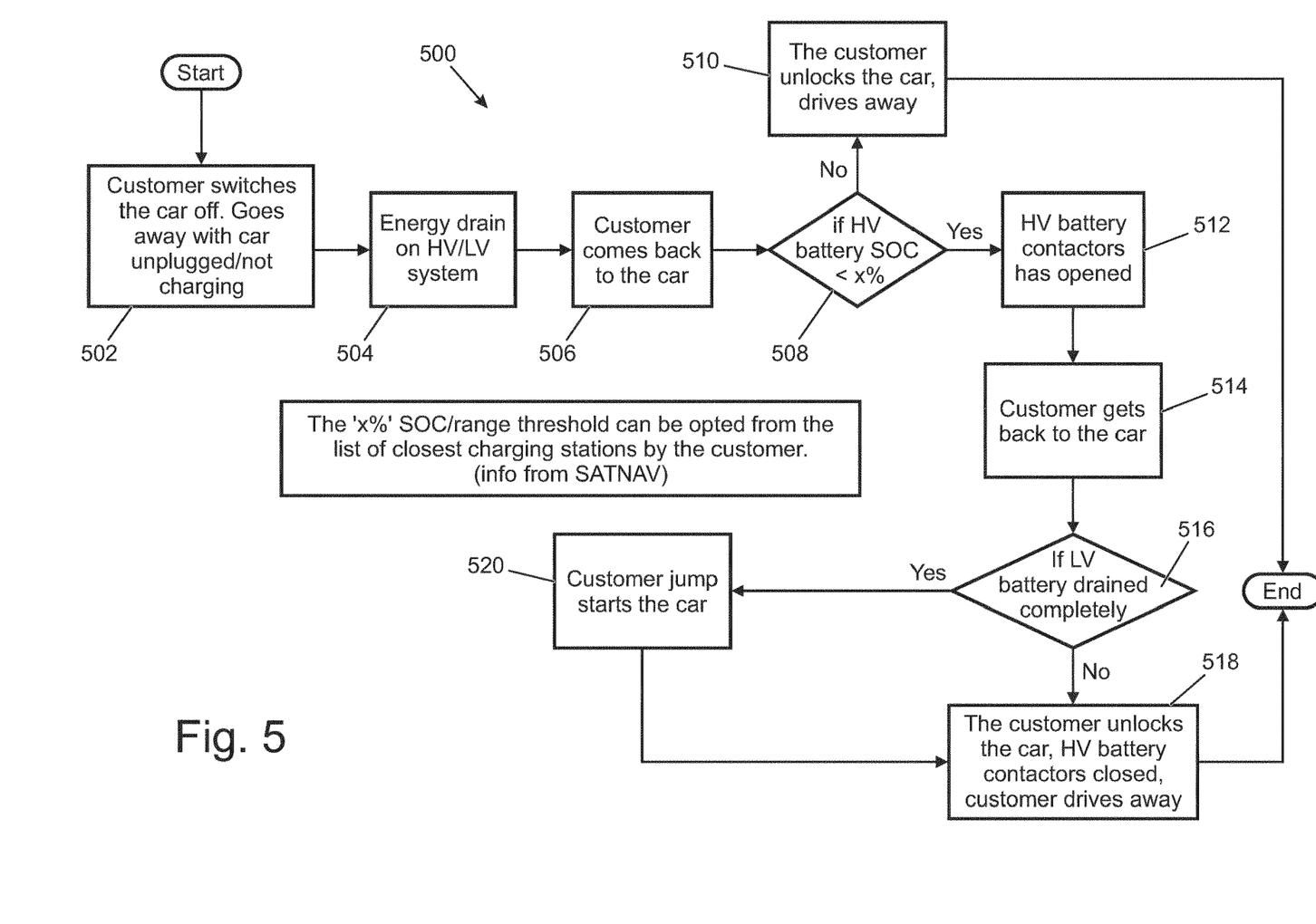
FIG. 5 illustrates an example of a method.

FIG. 5 illustrates an example of a method 500, some blocks of which may be performed by the apparatus 10-1, 10-2, 10-3 of FIG. 1, 3 or 4, or the control means of FIG. 2.

That is, in examples, the apparatus 10-1, 10-2, 10-3 of FIG. 1, 3 or 4, or the control means of FIG. 2 comprises means for performing blocks of the method 500.

At block 502 the user switches the vehicle 100 off and leaves the vehicle 100 without the vehicle 100 being connected to an external power supply. The vehicle 100 is therefore considered to be unplugged and not charging.

At block 504, through the operation of onboard electrical components and systems, a quiescent current is drawn from the low voltage battery 12. Furthermore, electrical energy may be transferred from a high voltage battery 14 to the low voltage battery 12 when the level of electrical energy stored in the low voltage battery 12 is below a first electrical energy threshold level, indicating insufficient charge in the low voltage battery 12, and a level of electrical energy stored in the high voltage battery 14 is above a second electrical energy threshold level, indicating sufficient charge in the high voltage battery 14.

The level of electrical energy stored in the low voltage battery 12 can be measured, for example by measuring the voltage across the two terminals of the low voltage battery 12. The level of electrical energy stored in the high voltage battery 14 can be measured, for example by measuring the voltage across the two terminals of the high voltage battery 14.

It is determined whether the level of electrical energy stored in the low voltage battery 12 is below a first electrical energy threshold level. It is determined whether the level of electrical energy stored in the high voltage battery 14 is above a second electrical energy threshold level. The transfer of electrical energy from the high voltage battery 14 to the low voltage battery 12 can be prevented if either the level of electrical energy stored in the high voltage battery 14 means falls to or below the second electrical energy threshold level or the level of electrical energy stored in the low voltage battery 12 rises to, or above, a third electrical energy threshold level.

If the level of electrical energy stored in the high voltage battery 14 means has fallen to or below the second electrical energy threshold level, the transfer of electrical energy from the high voltage battery 14 to the low voltage battery 12 can be prevented until the high voltage battery 14 is connected to an external source of energy, such as may be located at a charging point or charging station. The second electrical energy threshold may provide a predetermined state of charge for the high voltage battery 14 which may be set to provide sufficient electrical energy to drive the vehicle 100 via a traction motor to one or more nearby charging points.

At block 506, the user returns to the vehicle 100 and wishes to enter the vehicle 100 and drive the vehicle 100 to another location.

At block 508 it is determined if the level of electrical energy stored in the high voltage battery 14 is above or below a first electrical energy threshold level.

If the electrical energy stored in the high voltage battery 14 is above the first electrical energy threshold level, then the high voltage battery 14 has not been drained to the threshold level and the low voltage battery 12 should therefore have sufficient charge to operate normally, such that the user can then unlock the vehicle 100 and drive the vehicle 100, as indicated in block 510.

If the electrical energy stored in the high voltage battery 14 is at or below the first electrical energy threshold level, then the high voltage battery 14 has been drained to the threshold level. The high voltage battery 14 contactors are open, as indicated in block 512, and when the user returns to the vehicle 100, as indicated in block 514, the low voltage battery 12 may not have sufficient charge to operate normally, such that the user may not be able to unlock the vehicle 100 and/or drive the vehicle 100.

If, at block 516, the low voltage battery 12 has not been drained completely, or sufficiently to affect operation of the vehicle 100, the user may unlock the vehicle 100, the high voltage battery 14 contactors may be closed, and the user may unlock and drive the vehicle 100, as indicated in block 518. That is, there will be enough energy retained in the low voltage battery 12 to power the initialisation stages of the vehicle 100 and contactor controls.

If, at block 516, the low voltage battery 12 has been drained completely, or sufficiently to affect operation of the vehicle 100, the user may not be able to unlock or drive the vehicle 100. In such circumstances it will be necessary to jump start the vehicle 100 by using an external source of electrical energy, as indicated in block 520. Once the vehicle 100 has been jump started, the high voltage battery 14 contactors may be closed, and the user may unlock and drive the vehicle 100, as indicated in block 518.

Figure 6:
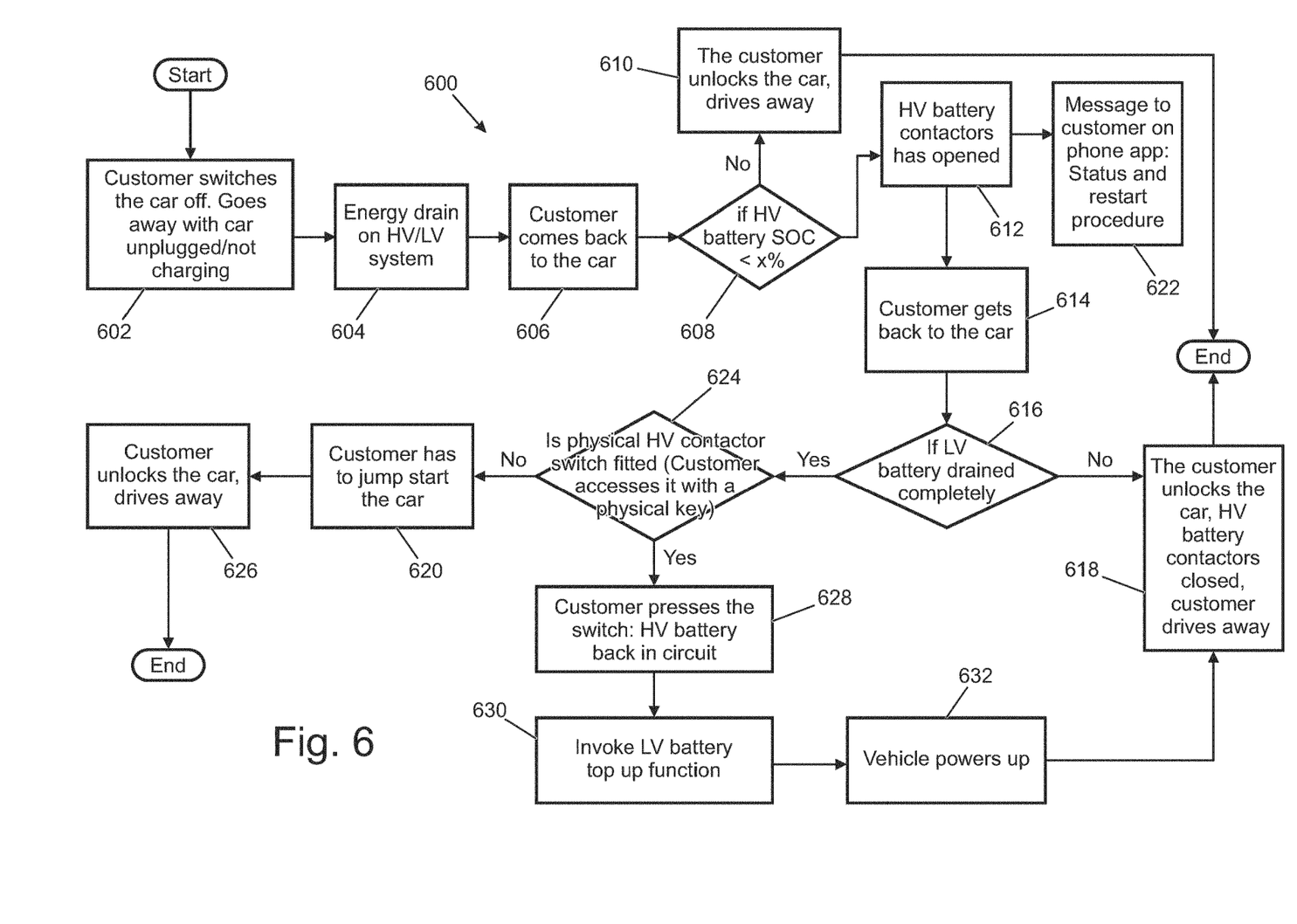
FIG. 6 illustrates an example of a method.

FIG. 6 illustrates an example of a method 600, some blocks of which may be performed by the apparatus 10-1, 10-2, 10-3 of FIG. 1, 3 or 4, or the control means of FIG. 2.

That is, in examples, the apparatus 10-1, 10-2, 10-3 of FIG. 1, 3 or 4, or the control means of FIG. 2 comprises means for performing blocks of the method 600.

In FIG. 6, similar blocks to the method in FIG. 5 are provided with similar reference numerals, except with a prefix of 6 rather than 5.

At block 602 the user switches the vehicle 100 off and leaves the vehicle 100 without the vehicle 100 being connected to an external power supply. The vehicle 100 is therefore considered to be unplugged and not charging.

At block 604, through the operation of onboard electrical components and systems, a quiescent current is drawn from the low voltage battery 12. Furthermore, electrical energy may be transferred from a high voltage battery 14 to the low voltage battery 12 when the level of electrical energy stored in the low voltage battery 12 is below a first electrical energy threshold level, indicating insufficient charge in the low voltage battery 12, and a level of electrical energy stored in the high voltage battery 14 is above a second electrical energy threshold level, indicating sufficient charge in the high voltage battery 14.

The level of electrical energy stored in the low voltage battery 12 can be measured, for example by measuring the voltage across the two terminals of the low voltage battery 12. The level of electrical energy stored in the high voltage battery 14 can be measured, for example by measuring the voltage across the two terminals of the high voltage battery 14.

It is determined whether the level of electrical energy stored in the low voltage battery 12 is below a first electrical energy threshold level. It is determined whether the level of electrical energy stored in the high voltage battery 14 is above a second electrical energy threshold level. The transfer of electrical energy from the high voltage battery 14 to the low voltage battery 12 can be prevented if either the level of electrical energy stored in the high voltage battery 14 means falls to or below the second electrical energy threshold level or the level of electrical energy stored in the low voltage battery 12 has risen to or above a third electrical energy threshold level.

If the level of electrical energy stored in the high voltage battery 14 means has fallen to or below the second electrical energy threshold level, the transfer of electrical energy from the high voltage battery 14 to the low voltage battery 12 can be prevented until the high voltage battery 14 is connected to an external source of energy, such as may be located at a charging point or charging station. The second electrical energy threshold may provide a predetermined state of charge for the high voltage battery 14 which may be set to provide sufficient electrical energy to drive the vehicle 100 via a traction motor to one or more nearby charging points.

At block 606, the user returns to the vehicle 100 and wishes to enter the vehicle 100 and drive the vehicle 100 to another location.

At block 608 it is determined if the level of electrical energy stored in the high voltage battery 14 is above or below a first electrical energy threshold level.

If the electrical energy stored in the high voltage battery 14 is above the first electrical energy threshold level, then the high voltage battery 14 has not been drained to the threshold level and the low voltage battery 12 should therefore have sufficient charge to operate normally, such that the user can then unlock the vehicle 100 and drive the vehicle 100, as indicated in block 610.

If the electrical energy stored in the high voltage battery 14 is at or below the first electrical energy threshold level, then the high voltage battery 14 has been drained to the threshold level. The high voltage battery 14 contactors are open, as indicated in block 612, and when the user returns to the vehicle 100, as indicated in block 614, the low voltage battery 12 may not have sufficient charge to operate normally, such that the user may not be able to unlock the vehicle 100 and/or drive the vehicle 100.

As an additional, optional feature, as indicated in block 622, when the high voltage battery 14 contactors have been opened, indicating that the high voltage battery 14 has been drained to or below the threshold level, the electronic controller 16, or a further electronic control unit of the vehicle 100, can be arranged to facilitate the sending of a message to the user via a telecommunications network, to be received at a mobile device of the user, indicating the status of the vehicle 100, and providing instructions on the procedure to follow on return to the vehicle 100 in order to be able to drive the vehicle 100.

If, at block 616, the low voltage battery 12 has not been drained completely, or sufficiently to affect operation of the vehicle 100, the user may unlock the vehicle 100, the high voltage battery 14 contactors may be closed, and the user may drive the vehicle 100, as indicated in block 618.

If, at block 616, the low voltage battery 12 has been drained completely, or sufficiently to affect operation of the vehicle 100, the user may not be able to unlock or drive the vehicle 100. In such circumstances it will be necessary to provide further energy to the low voltage battery 12, in order to be able to unlock and drive the vehicle 100.

However, a mechanical key can still be used to gain entry to the vehicle and gain entry to the battery to initialize charging of the low voltage battery 12. In particular, if the vehicle 100 is fitted with a physical high voltage battery 14 contactor switch 28 to engage transfer of electrical energy from the high voltage battery 14 to the low voltage battery 12, the mechanical key may be used to gain access to the contactor switch 28.

At block 624, if the vehicle 100 is not fitted with a physical high voltage battery contactor switch 28 to engage transfer of electrical energy from the high voltage battery 14 to the low voltage battery 12, then the user will have to jump start the vehicle 100 by using an external source of electrical energy, as indicated in block 620. Once the vehicle 100 has been jump started, the high voltage battery 14 contactors may be closed, and the user may unlock and drive the vehicle 100, as indicated at block 626.

At block 624, if the vehicle 100 is fitted with a physical high voltage battery 14 contactor switch 28 to engage transfer of electrical energy from the high voltage battery 14 to the low voltage battery 12, then the user may access the physical switch 28. In block 628 the user may engage the physical switch 28 to put the high voltage battery 14 back in the electrical circuit. At block 630, by engaging the physical switch 28, the user facilitates transfer of electrical energy from the high voltage battery 14 to the low voltage battery 12. At block 632, the vehicle 100 may then be powered up if sufficient electrical energy is provided to the low voltage battery 12. The user may then access and drive the vehicle 100, as indicated at block 618.

FIG. 7 illustrates a vehicle 100 which may comprise an apparatus 10-1, 10-2, 10-3 as described above or an apparatus 10-1, 10-2, 10-3 arranged to carry out the methods as described above.

In one implementation, a user may be able to enable the system (that is, to transfer electrical energy from the high voltage battery 14 to the low voltage battery 12) by docking or otherwise physically connecting a mobile phone (or any other device with a battery/charge) with the vehicle to actuate an electronic switch (instead of the physical switch 28) to an ON or OFF position to either put the high voltage battery 14 into the electrical circuit (ON) or remove it from the electrical circuit (OFF). The vehicle may therefore be provided with a suitable docking station to receive the mobile phone or other portable electronic device. The docking station may simply comprise switching circuitry connected to and powered by the mobile phone and means for connecting the mobile phone to the docking station. The means for connecting may be a micro-USB or Lightning socket/port and/or cable, or may be a wireless charging pad which creates an electrical connection with the mobile phone via electromagnetic induction.

Additionally, the switching OFF could be carried out remotely using a capable device, such as a smartphone with suitable software installed thereon. The remote operation may for example involve the transmission of an OFF instruction via a Bluetooth link between the smartphone and the vehicle, in response to which the high voltage battery 14 may be removed from the electrical circuit.

Various security measures can be provided in order to restrict access to the switch. For example, the docking station could be in a secure location such as under the bonnet, in the boot or in a locked compartment within the vehicle cabin. Further, the ability to control the switch by docking a mobile phone may be restricted to mobile phones which have been configured in advance to be used in this way, for example by pairing the mobile phone with the docking station.

For purposes of this disclosure, it is to be understood that the electronic controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor (s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

As used here 'module' refers to a unit or apparatus that excludes certain parts/components that would be added by an end manufacturer or a user.

The blocks illustrated in the FIGS. 5 and 6 may represent steps in a method and/or sections of code in the computer program 62. The illustration of a particular order to the blocks does not necessarily imply that there is a required or preferred order for the blocks and the order and arrangement of the block may be varied. Furthermore, it may be possible for some steps to be omitted.

As used herein 'for' should be considered to also include 'configured or arranged to'. For example 'a system for' should be considered to also include 'a system configured or arranged to'.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for a vehicle, said apparatus comprising:
a first energy storage means for storing electrical energy, wherein the first energy storage means is a low voltage energy storage means arranged to provide electrical energy for onboard vehicle systems;
a second energy storage means for storing electrical energy, wherein the second energy storage means is a high voltage energy storage means arranged to provide power to an electric motor which in turn drives one or more wheels of an electric vehicle; and
a control means arranged to:
transfer electrical energy from the second energy storage means to the first energy storage means when a level of electrical energy stored in the first energy storage means is below a first electrical energy threshold level and a level of electrical energy stored in the second energy storage means is above a second electrical energy threshold level; and
stop the transfer of electrical energy from the second energy storage means to the first energy storage means responsive to the level of electrical energy stored in the second energy storage means dropping to or below the second electrical energy threshold level, wherein the second electrical energy threshold level is set to provide a level of electrical energy in the second energy storage means sufficient for the vehicle to travel a distance to one or more charging points.

2. The apparatus according to claim 1, wherein the apparatus further comprises a voltage level conversion means operatively connected to the first energy storage means and the second energy storage means and arranged to step down the voltage from a voltage of the second energy storage means to a voltage of the first energy storage means.

3. The apparatus according to claim 1, further comprising a first measuring means arranged to measure the level of electrical energy stored in the first energy storage means and a second measuring means arranged to measure the level of electrical energy stored in the second energy storage means.

4. The apparatus according claim 3, wherein the first measuring means and the second measuring means are the same measuring means, arranged to measure each of the level of electrical energy stored in the first energy storage means and the level of electrical energy stored in the second energy storage means in a time differentiated sequence.

5. The apparatus according to claim 1, wherein the second electrical energy threshold level is a predetermined minimum state of charge.

6. The apparatus according to claim 5, wherein the predetermined minimum state of charge is user selectable.

7. The apparatus according to claim 5, wherein the distance to the one or more charging points is determined from satellite navigation data in conjunction with data regarding the location of the one or more charging points.

8. The apparatus according to claim 1, wherein the apparatus further comprises a transfer engagement means arranged to transfer electrical energy from the second energy storage means to the first energy storage means.

9. The apparatus according to claim 8, wherein the transfer engagement means is a physical switch and wherein the transfer engagement means is accessible to the user via a key.

10. The apparatus according to claim 8, wherein on actuation of the transfer engagement means electrical energy is transferred from the second energy storage means to the first energy storage means.

11. The apparatus according to claim 8, wherein the transfer engagement means comprises a facility to dock or otherwise electrically connect a portable electronic device to the apparatus, the transfer engagement means being responsive to the docking or electrical connection of the portable electronic device to transfer electrical energy from the second energy storage means to the first energy storage means.

12. A vehicle comprising an apparatus as claimed in claim 1.

13. A method, comprising:
transferring electrical energy from a second energy storage means to a first energy storage means when a level of electrical energy stored in the first energy storage means is below a first electrical energy threshold level and a level of electrical energy stored in the second energy storage means is above a second electrical energy threshold level, wherein the first energy storage means is a low voltage energy storage means arranged to provide electrical energy for onboard vehicle systems, wherein the second energy storage means is a high voltage energy storage means arranged to provide power to an electric motor which in turn drives one or more wheels of an electric vehicle, and wherein the second electrical energy threshold is set to provide a level of electrical energy in the second energy storage means sufficient for a vehicle to travel a distance to one or more charging points; and
stopping the transferring of electrical energy from the second energy storage means to the first energy storage means responsive to the level of electrical energy stored in the second energy storage means dropping to or below the second electrical energy threshold level.

14. The method according to claim 13, further comprising:
determining whether the level of electrical energy stored in the first energy storage means is below the first electrical energy threshold level; and
determining whether the level of electrical energy stored in the second energy storage means is above the second electrical energy threshold level.

15. The method according to claim 13, further comprising:
preventing the transfer of electrical energy from the second energy storage means to the first energy storage means when the level of electrical energy stored in the second energy storage means falls below the second electrical energy threshold level.

16. The method according to claim 13, further comprising:
preventing the transfer of electrical energy from the second energy storage means to the first energy storage means when the level of electrical energy stored in the first energy storage means subsequently rises above a third electrical energy threshold level.

17. The method according to claim 13, further comprising:
preventing the transfer of electrical energy from the second energy storage means to the first energy storage means when the frequency of transfer of electrical energy from the second energy storage means to the first energy storage means exceeds a threshold frequency value.

18. The method according to claim 13, further comprising:
determining the distance to the one or more charging points from satellite navigation data in conjunction with data regarding the location of the one or more nearby charging points.

19. The method according to claim 18, further comprising:
determining the location of the one or more nearby charging points on shutdown of the vehicle.

20. A non-transitory computer readable storage medium storing instructions that, when executed by a processor, cause a system to perform the method of claim 13.

21. An electronic controller comprising: at least one processor; and at least one memory including computer program code, the at least one memory and the computer program code configured to, with the at least one processor, cause the electronic controller to perform:
transferring electrical energy from a second energy storage means to a first energy storage means when a level of electrical energy stored in the first energy storage means is below a first electrical energy threshold level and a level of electrical energy stored in the second energy storage means is above a second electrical energy threshold level; and
stopping the transferring of electrical energy from the second energy storage means to the first energy storage means responsive to the level of electrical energy stored in the second energy storage means dropping to or below the second electrical energy threshold level,
wherein the first energy storage means is a low voltage energy storage means arranged to provide electrical energy for onboard vehicle systems,
wherein the second energy storage means is a high voltage energy storage means arranged to provide power to an electric motor which in turn drives one or more wheels of an electric vehicle, and
wherein the second electrical energy threshold is set to provide a level of electrical energy in the second energy storage means sufficient for a vehicle to travel a distance to one or more charging points.

* * * * *